(12) United States Patent
Brown (10) Patent No.: US 10,072,779 B2
(45) Date of Patent: Sep. 11, 2018

(54) CLAMSHELL COUPLING

(71) Applicant: Glenn Brown, Spring, TX (US)

(72) Inventor: Glenn Brown, Spring, TX (US)

(*) Notice: Subject to any disclaimer, the term of this patent is extended or adjusted under 35 U.S.C. 154(b) by 40 days.

(21) Appl. No.: 15/218,324

(22) Filed: Jul. 25, 2016

(65) Prior Publication Data

US 2018/0023736 A1    Jan. 25, 2018

(51) Int. Cl.
*F16L 21/06* (2006.01)
*F16L 3/10* (2006.01)

(52) U.S. Cl.
CPC .......... *F16L 21/065* (2013.01); *F16L 3/1075* (2013.01); *F16L 3/1091* (2013.01); *F16L 2201/40* (2013.01)

(58) Field of Classification Search
CPC .......... F16L 21/065; F16L 23/08; F16L 23/10
USPC .................................. 285/411, 367
See application file for complete search history.

(56) References Cited

U.S. PATENT DOCUMENTS

| | | | | |
|---|---|---|---|---|
| 3,077,360 A * | 2/1963 | Israel | ...................... | F16L 23/08 220/315 |
| 3,963,218 A * | 6/1976 | Glaesener | ........... | E01F 15/0453 256/13.1 |
| 4,225,160 A * | 9/1980 | Ortloff | ..................... | F16L 23/08 285/123.2 |
| 4,486,037 A * | 12/1984 | Shotbolt | ............... | F16L 27/053 285/367 |
| 5,868,442 A * | 2/1999 | Lin | ........................ | F16L 23/10 285/367 |
| 7,549,681 B1 * | 6/2009 | Matzner | ................ | F16L 21/065 285/367 |
| 7,921,536 B2 * | 4/2011 | Dole | ..................... | F16L 21/065 29/463 |
| 8,739,863 B2 * | 6/2014 | Linde | ..................... | E21B 17/02 285/411 |

FOREIGN PATENT DOCUMENTS

| | | | | |
|---|---|---|---|---|
| GB | 1012865 A | * | 12/1965 | ............. F16L 23/10 |
| JP | 2006177048 A | * | 7/2006 | ............ F16L 21/065 |

* cited by examiner

*Primary Examiner* — David Bochna
(74) *Attorney, Agent, or Firm* — Norton Rose Fulbright US LLP (57) ABSTRACT

A coupling configured with at least one fastener for compressing and also opening the coupling. The fastener may be at least one jack screw.

17 Claims, 7 Drawing Sheets

CLAMSHELL COUPLING

TECHNICAL FIELD

The present disclosure relates to a mechanical coupling, and in particular, a clamshell coupling configured to open and close mechanically.

BACKGROUND

The present invention relates to couplings for attaching various mechanical devices, such as hoses, manifolds, and similar connections. More particularly, the present invention pertains to a coupling that includes at least one fastener configured to open the coupling.

Previously, conventional compression couplings were configured only to connect two or more separate devices (e.g., hose, manifold, etc.) together. The compression coupling came in at least two parts which fit around the connection areas (e.g., shaft, neck, etc.) of the two devices being coupled. On many applications such as industrial applications and cryogenic applications, the prior art compression couplings effectively coupled; however, they often become seized together with the devices they coupled.

SUMMARY

The present invention, as described herein, addresses the problems described above and other problems of prior art systems and methods which will become apparent to one skilled in the art from the description below. Generally, the present invention provides a coupling that includes at least one fastener which is configured to compress the coupling, and further, is also configured to open the coupling. For example, the clamshell coupling may include at least one jackscrew that is configured to compress the coupling and is also configured to open the coupling. As such, the clamshell coupling is an improvement over the conventional threaded coupling currently being used in the cryogenic industry. The clamshell fitting can be used for any type of connection, including cryogenic liquids.

In a first aspect, the clamshell coupling includes a first coupling section and a first fastener, wherein the first fastener is configured to compress the coupling, and wherein the first fastener is configured to open the coupling.

In a second aspect, the clamshell coupling includes a first coupling section; a first fastener, wherein the first fastener is configured to compress the coupling, wherein the first fastener is configured to open the coupling; a second coupling section, wherein the first coupling section and the second coupling section are fastened together in at least one position in order to couple.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Various embodiments of the coupling shall be described with reference to FIGS. 1-8. The particular features of the disclosed embodiments should not be limited to just those illustrated configurations. Instead, the various features disclosed within this disclosure may be combined to create exponentially more embodiments not explicitly illustrated within this disclosure. As one example, the various fasteners and configurations for opening and closing the clamshell coupling which are disclosed within may be combined in far more configurations than illustrated within the confines of this disclosure.

Figure 1:
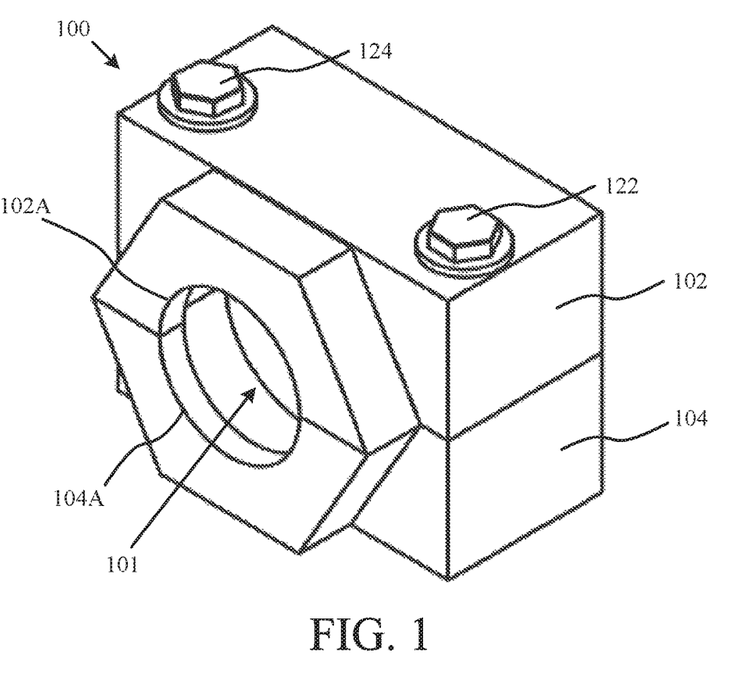
FIG. 1 shows a perspective view of a coupling 100, according to one example embodiment of the present invention.

FIG. 1 shows a perspective view of a coupling 100, according to an exemplary embodiment of the present invention. In many embodiments, and as illustrated in FIG. 1, coupling 100 includes two separable sections, 102 and 104. Coupling 100 may include sections that are held together by various fasteners, such as a hinge(s) (e.g., 210, 310, etc.) and/or unlocking bolt(s) (e.g., 122, 124, etc.). For example, and as shown in the illustrated embodiment of FIG. 1, coupling 100 is connected by jack screws, 122 and 124 (jack screw and locking/unlocking bolt may be used interchangeably). Coupling 100 includes an aperture 101 configured to surround the two or more components (e.g., fittings) that are being coupled. In many embodiments, the aperture 101 has a circular circumference configured to mirror the circumference of the components being fitted. It should be understood that the shape of aperture 101 may be adapted to fit the particular shape of the components being coupled (e.g., hexagon, etc.). As shown by 102A and 104A, aperture 101 is divided between sections 102 and 104.

Figure 2:
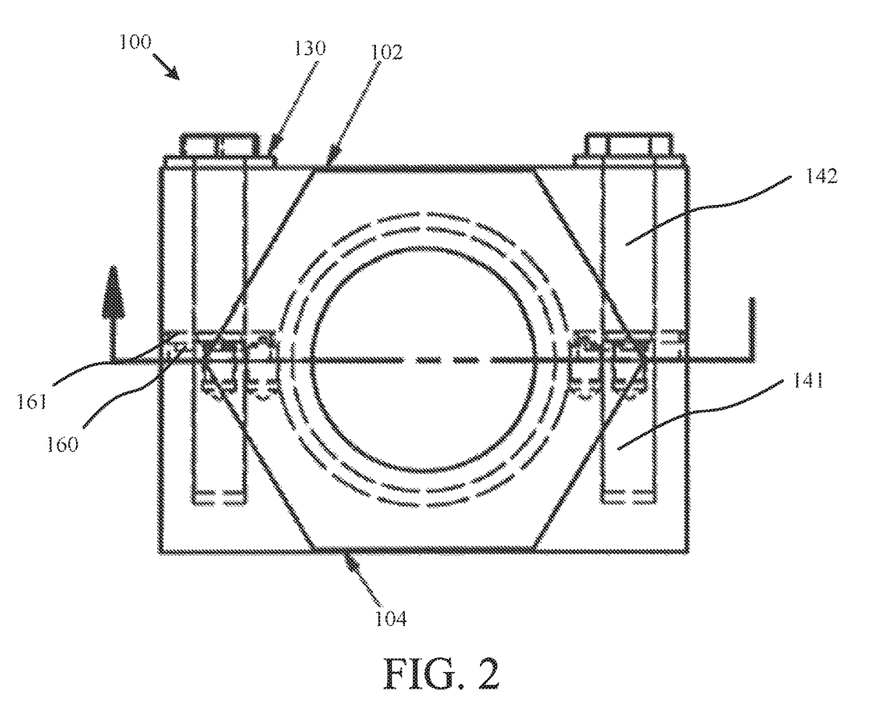
FIG. 2 shows a front view of a coupling 100, according to one example embodiment of the present invention.

FIG. 2 shows a front view of a coupling 100, according to one embodiment of the present invention. Sections 102 and 104 may include one or more bore(s) (e.g., 141 and 142) configured to accommodate a fastener, such as a jack screw. In order to couple, sections 102 and 104 fit together to create a coupling assembly that completes the circumference of aperture 101. Fasteners such as 122 and 124 may incorporate a washer(s) 130. The fasteners (e.g., 122 and/or 124) may be held in place with a snap ring (e.g., 160). In some configurations, snap ring 160 prevents the jack screw 122 or 124 from becoming separated from section 102. It should be understood that various alternatives exist for snap ring 160, such as a sleeve which covers a larger portion of fastener 122 and/or 124. In conjunction with the fastener(s), snap ring 160 may assist in separating section 102 from section 104 (i.e., opening the coupling). In many embodiments, the coupling 100 has an unthreaded bore 142 in section 102 but has a threaded bore 141 in section 104. In this configuration, rotating the fasteners 122 and 124 counterclockwise opens the coupling.

Figure 3:
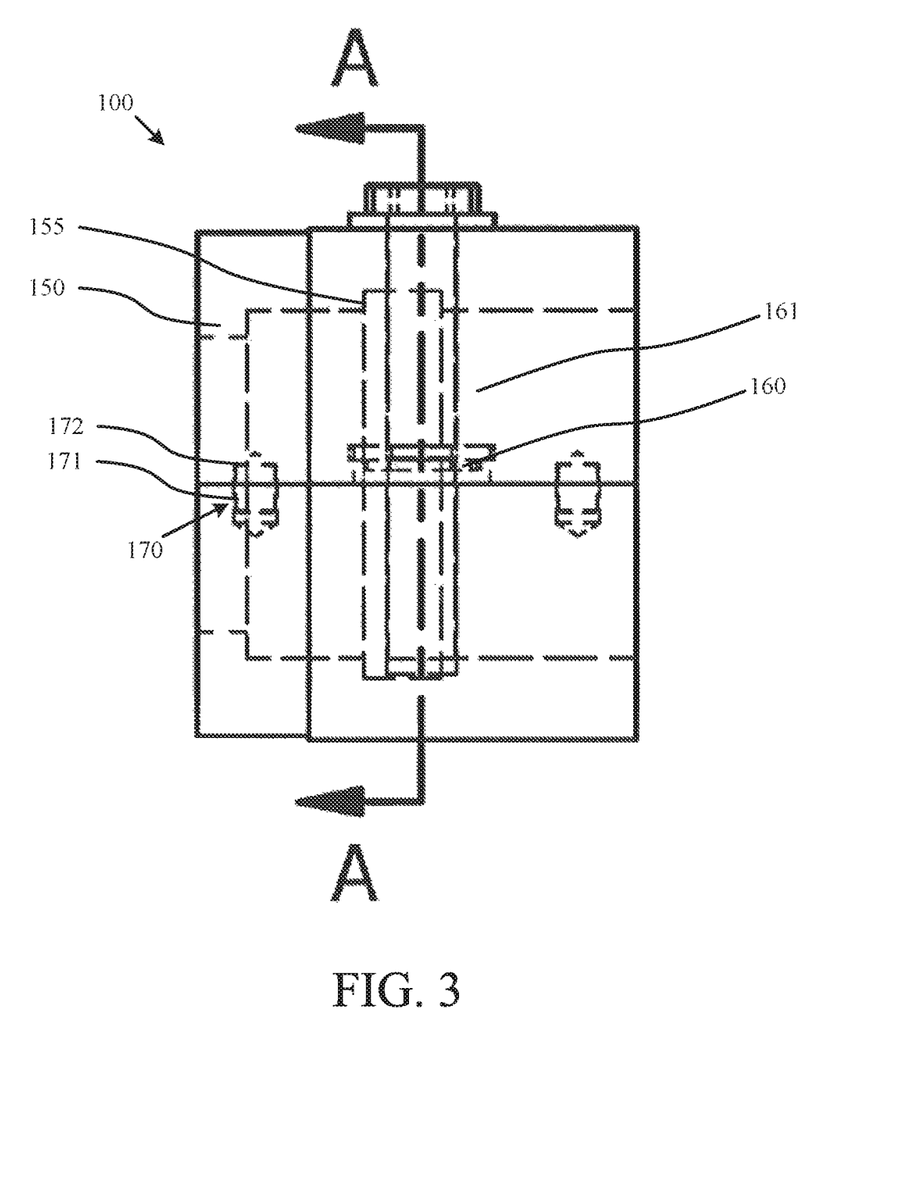
FIG. 3 shows a side view of a coupling 100, according to one example embodiment of the present invention.

FIG. 3 shows a side view of a coupling 100, according to one example embodiment of the present invention. The aperture 101 of coupling 100 includes different apertures (e.g., 150 and 155) in order to prevent separation of the two or more fittings. Further, coupling 100 may include structures that align sections 102 and 104 together and also reduce the torsional strain on the fasteners. For example, section 104 may include alignment dowels 170, each with a protrusion 171 ("alignment dowel" or "male" portion) which fits into a similarly sized and shaped cavity 172 ("female" portion) in section 102. It typically does not matter which section has the male portion or corresponding female portion. Further, it should be understood that other structures may be used, such as a ridge on one section and corresponding valley on the other section, or further, a lip extending around the perimeter on one section which surrounds the perimeter of the other section (e.g., shoebox lid).

Figure 4A:
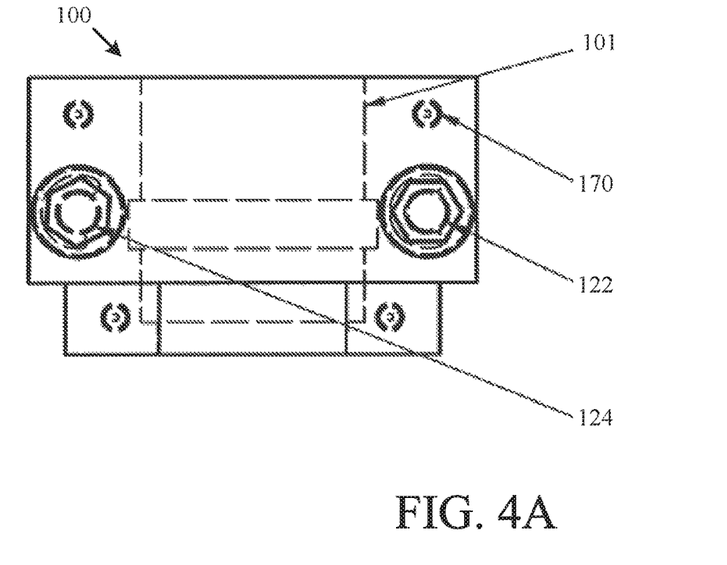
FIGS. 4A and 4B show a top and bottom view of an exemplary section 102, according to one example embodiment of the present invention.
Figure 4B:
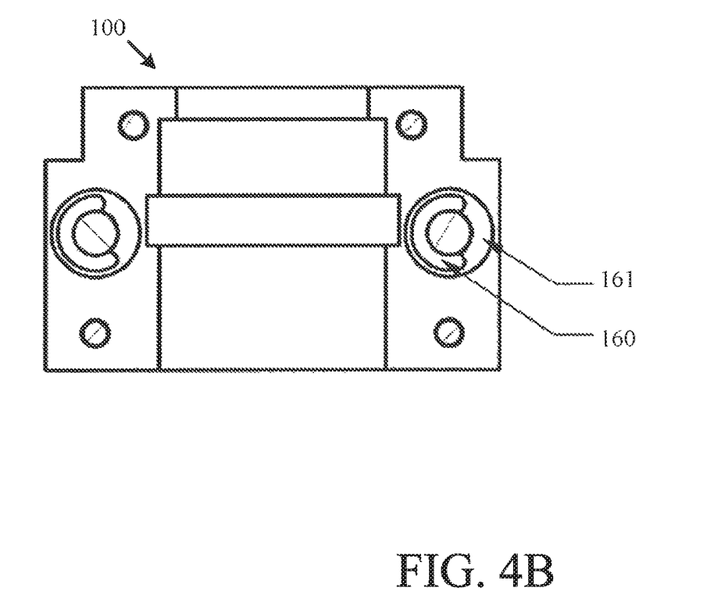

FIGS. 4A and 4B show a top and bottom view of an exemplary section 102, according to one example embodiment of the present invention. FIG. 4A shows a top view of an exemplary section 102. The fasteners 122 and 124 may be threaded per the specification and size required for a particular application. Alignment dowels 170 may be placed throughout the coupling to secure sections 102 and 104 together. For example, the illustrated embodiment includes four alignment dowels. The aperture 101 may be configured to accommodate the fittings it will be mating (e.g., 2.4-4 Stub ACME-2G-RH-INT to 2.4-4 Stub ACME-2-G-RH-EXT). FIG. 4B shows a bottom view of an exemplary section 102. The cross sectional view of FIG. 4B is identified in FIG. 2. In the illustrated embodiment, snap ring 161 prevents fasteners 122 and 124 from separating from section 102. Further, the connection of snap ring 161 with section 102 allows the coupling 100 to open mechanically when fasteners 122 and 124 are rotated, which is typically a counterclockwise rotation, but is dependent upon the direction of the threading of the fastener and the threaded bore.

Figure 5:
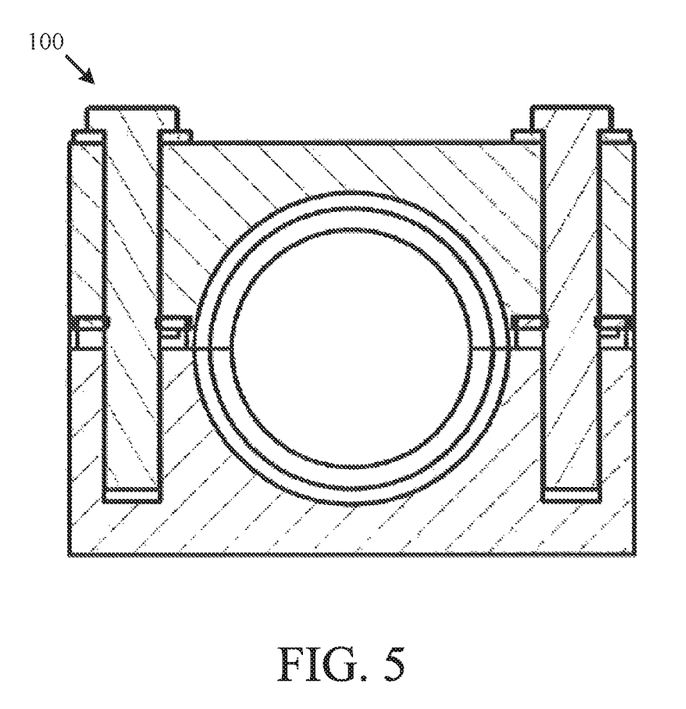
FIG. 5 shows a cross section of a coupling 100, according to one example embodiment of the present invention.

FIG. 5 shows a cross section of a coupling 100, according to one example embodiment of the present invention. The cross sectional view of FIG. 5 is identified in FIG. 3 as the section line A-A. In embodiments with jack screws or similar fasteners, coupling 100 tightens one or more sealing surfaces together by linearly compressing one or more sealing surfaces against one or more corresponding sealing surfaces of at least one fitting (this may include sealing surfaces that use gaskets), which can be accomplished using a standard sized wrench. To open, coupling 100 loosens one or more sealing surfaces from one or more corresponding sealing surfaces of at least one fitting by moving apart section 102 and 104 from each other. When section 102 and 104 move apart, the tight bond of the male fitting and the coupling 100 is loosened ("broken loose") without the use of a hammer or similar tool. In one embodiment, the coupling 100 is loosened and removed by untightening/loosening the fastener 122 and 124. This allows the coupling to be opened to varying positions and rotated by hand or with a wrench. This configuration allows the sealing surfaces to be disconnected from their corresponding fitting sealing surfaces. As such, the unsafe hammering to "break loose" the coupling when the transfer of fluid (or similar) is complete is no longer needed. Coupling 100 can be used in place of standard couplings on existing fittings, and as such, no retrofit of the existing delivery end or existing receiving end is necessary.

Figure 6:
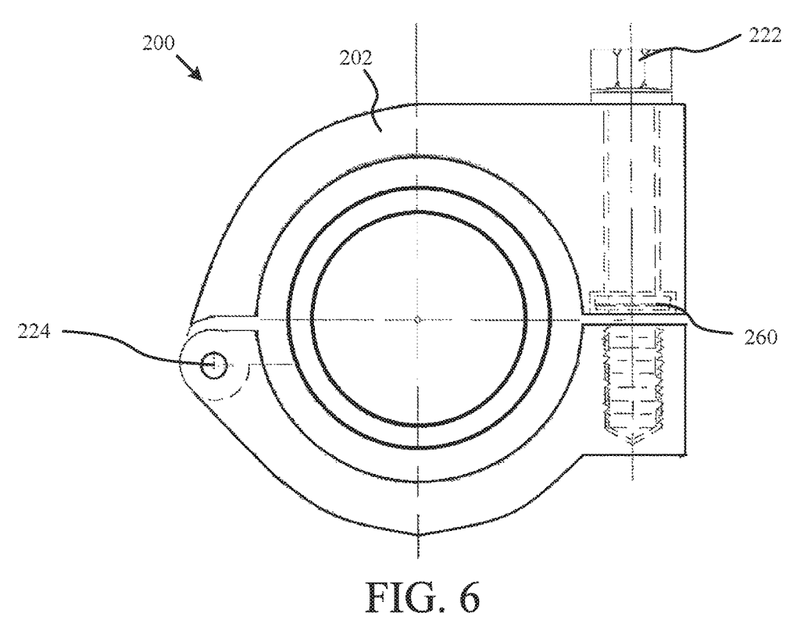
FIG. 6 shows a coupling 200 with various fasteners, according to one example embodiment of the present invention.
Figure 7:
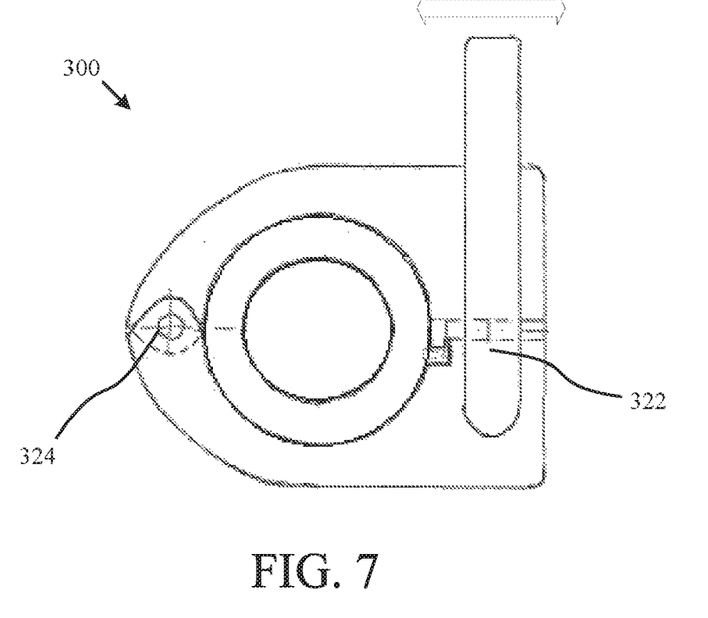
FIG. 7 shows coupling 300 with various fasteners, according to one example embodiment of the present invention.
Figure 8:
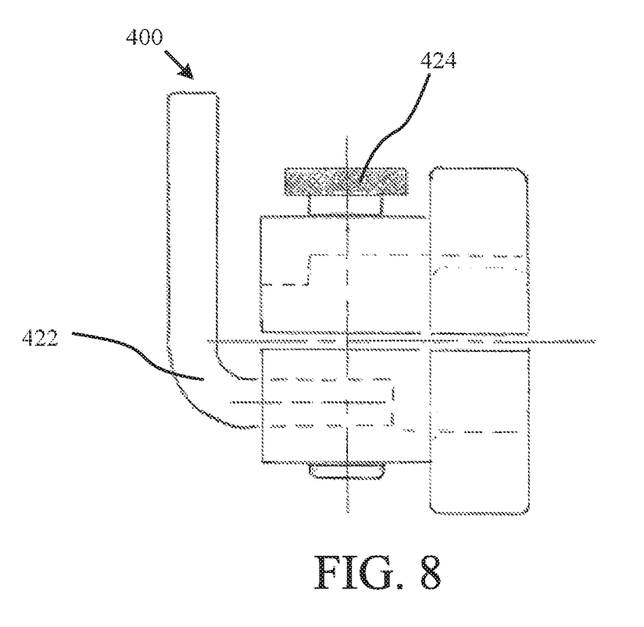
FIG. 8 shows coupling 400 with various fasteners, according to one example embodiment of the present invention.

FIG. 6 shows a coupling 600 with a hinge fastener, according to one example embodiment of the present invention. It should be understood that some embodiments may use a pivot point (e.g., hinge, 224) in place of a jack screw (e.g., 124), as shown by the exemplary embodiment in FIG. 6. In such a configuration, jackscrew 222 is configured to open and close the clamshell coupling about the pivot point. Snap ring 260 secures fastener 222 to section 202. The bore of section 202 may be configured (e.g., enlarged) to accommodate for the arcuate opening direction of coupling 200. Alternatively, fastener 202 may use a pivoting attachment point attach to section 202, in which the attachment point pivots on an axis that is parallel with hinge 224 (e.g., a sleeve surrounding the jack screw that also includes an attachment pin with a pivot axis parallel to the hinge pivot axis). Alternatively, it should be understood that some embodiments may use one unitary section instead of two separable sections 202 and 204. For example, the coupling—or at least a portion of the coupling—may be created out of a metal, polymer, plastic, or other similar material that is sufficiently rigid to act as a coupling but yet pliable enough to open far enough to release the coupling, and as such, the coupling may use a single unlocking bolt but not require a hinge/pivot point.

FIGS. 7A & 7B show couplings 300 and 400 with various fasteners, according to one example embodiment of the present invention. As additional examples of possible fasteners, couplings 300 and 400 include latch fasteners, 322 and 422, respectively. Coupling 300 includes a hinge 324 while coupling 400 includes a jack screw, 424. The latch fastener is configured to open and close by rotating, as shown by the arrow. An internal latch on the latch fastener locks the two sections together when rotated. An internal cam on the latch opens the two sections when rotated the other direction. The sections 304 and 404 are configured with a bore to accept the latch fasteners. Further, sections 304 and 404 may be configured with channels/recesses to accept the internal latch and internal cam.

Although the present disclosure and its advantages have been described in detail, it should be understood that various changes, substitutions and alterations can be made herein without departing from the spirit and scope of the disclosure as defined by the appended claims. It should be noted that any of the various feature(s) disclosed in the detailed description may be excluded from any one of the various embodiments (i.e., a negative limitation of a particular feature) for the purpose of reducing cost, reducing complexity, increasing breathability, distinguishing from other methods and/or systems, and/or removing duplicative features that may be provided by a separate method or system, especially when the other method or system is connected with the present method and/or system. Further, various industries will require different combinations of the various features of the disclosed invention, and in particular, may need to limit or exclude certain features (i.e., a negative limitation of a various feature). Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A coupling, comprising:
   a first coupling section;
   a second coupling section;
   a threaded bore formed in the second coupling section;
   a first fastener configured to:
     engage the threaded bore of the second coupling section;
     move the first coupling section and the second coupling section towards each other when a closing force is applied to the first fastener; and
     move the first coupling section away from the second coupling section when an opening force is applied to the first fastener;
   a first contact surface formed on the first coupling section;
   a second contact surface formed on the second coupling section;
   a stepped bore formed in the first coupling section, the stepped bore being coaxial with the threaded bore of the second coupling section; wherein the first fastener is situated inside the stepped bore;
   a first section formed in the stepped bore, the first section having a first diameter; and
   a second section formed in the stepped bore, the second section having a second diameter; wherein:
     the first contact surface and the second contact surface directly contact each other when the closing force is applied to the first fastener;
     the first contact surface and the second contact surface separate from each other when the opening force is applied to the first fastener;
     the closing force is applied to the first fastener in a first direction;
     the opening force is applied to the first fastener in a second direction
     the first section and the second section are coaxial; and
     a diameter of the second section is greater than a diameter of the first section.
2. The coupling of claim 1, further comprising:
   a second fastener.
3. The coupling of claim 1, further comprising:
   a second fastener.
4. The coupling of claim 1, further comprising:
   a hinge.
5. The coupling of claim 1, further comprising:
   a hinge.
6. The coupling of claim 1, further comprising:
   a snap ring attached to the first fastener, the snap ring configured to engage with the first coupling section when the opening force is applied to the first fastener so as to move the first coupling section away from the second coupling section.
7. The coupling of claim 6, wherein the first fastener is a jack screw and the first direction is a clockwise direction.
8. The coupling of claim 6, wherein the first fastener is a jack screw and the second direction is a counterclockwise direction.
9. The coupling of claim 1, further comprising:
   a snap ring attached to the first fastener, the snap ring having a diameter larger than the diameter of the first section of the stepped bore.
10. The coupling of claim 9, wherein the snap ring is configured to engage the first coupling section when the opening force is applied to the first fastener so as to move the first coupling section away from the second coupling section.
11. The coupling of claim 10, further comprising:
    a protrusion formed on the first contact surface of the first coupling section, the protrusion extending away from the first contact surface; and
    a cavity formed on the second contact surface; wherein the cavity is positioned to receive the protrusion when the first contact surface and the second contact surface contact each other.
12. The coupling of claim 10, further comprising:
    a protrusion formed on the second contact surface of the second coupling section, the protrusion extending away from the second contact surface; and
    a cavity formed on the first contact surface; wherein the cavity is positioned to receive the protrusion when the first contact surface and the second contact surface contact each other.
13. The coupling of claim 9, wherein the second section of the stepped bore extends inwardly from the first contact surface; and wherein the snap ring is positioned completely inside the second section of the stepped bore so that the snap ring does not contact the second contact surface when the first contact surface and the second contact surface contact each other.
14. The coupling of claim 1, further comprising:
    a hinge fastener that connects the first coupling section to the second coupling section; wherein the hinge fastener is configured to pivot the first coupling section and the second coupling section about a single pivot point; and
    a stepped bore formed in the first coupling section; wherein the stepped bore is configured to accommodate arcuate opening of the coupling.
15. The coupling of claim 1, wherein the coupling is configured to connect a first cryogenic hose to a second cryogenic hose.
16. A method of mechanically coupling and decoupling a first mechanical device to a second mechanical device using a coupling device, the method comprising:
    (a) inserting a first mechanical device into a coupling device, the coupling device including:
      a first coupling section
      a second coupling section;
      a threaded bore formed in the second coupling section;
      a first fastener configured to engage the threaded bore of the second coupling section; and
      a snap ring attached to the first fastener, the snap ring configured to engage with the first coupling section;
      a first contact surface formed on the first coupling section;

a second contact surface formed on the second coupling section;

a stepped bore formed in the first coupling section, the stepped bore being coaxial with the threaded bore of the second coupling section; wherein the first fastener is situated inside the stepped bore;

a first section formed in the stepped bore, the first section having a first diameter; and a second section formed in the stepped bore, the second section having a second diameter;

(b) inserting a second mechanical device into the coupling device, (c) applying a closing force to the first fastener to move the first coupling section and the second coupling section towards each other and into engagement with the first and second mechanical devices to effect a coupling between the first and second mechanical devices; and (d) applying an opening force to the first fastener so that the snap ring engages with the first coupling section; and wherein the snap ring is configured to move the first coupling section away from the second coupling section to decouple the first and second mechanical devices; wherein:

the first contact surface and the second contact surface directly contact each other when the closing force is applied to the first fastener;

the first contact surface and the second contact surface separate from each other when the opening force is applied to the first fastener;

the closing force is applied to the first fastener in a first direction;

the opening force is applied to the first fastener in a second direction the first section and the second section are coaxial; and a diameter of the second section is greater than a diameter of the first section.

17. The method of claim 16, wherein the first fastener is a jack screw;

wherein the closing force is applied in a clockwise direction; and wherein the opening force is applied in a counterclockwise direction.

\* \* \* \* \*